(12) United States Patent
Burkett et al.

(10) Patent No.: US 8,939,655 B2
(45) Date of Patent: Jan. 27, 2015

(54) DUST CAPS, FIBER OPTIC CONNECTORS, AND FIBER OPTIC SPLITTER MODULES INCORPORATING INTERLOCKING KEY FEATURES

(75) Inventors: Alan Duncan Burkett, Bedford, TX (US); William Julius McPhil Giraud, Azle, TX (US); Michael de Jong, Colleyville, TX (US); Diana Rodriguez, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 185 days.

(21) Appl. No.: 13/537,796

(22) Filed: Jun. 29, 2012

(65) Prior Publication Data

US 2014/0003772 A1    Jan. 2, 2014

(51) Int. Cl.
*G02B 6/36* (2006.01)

(52) U.S. Cl.
USPC .......... 385/78; 385/73; 385/74; 385/76; 385/77; 385/81

(58) Field of Classification Search
CPC .. G02B 6/3885; G02B 6/3825; G02B 6/3869; G02B 6/3887; G02B 6/36
USPC ......... 385/53, 55, 73, 74, 76–78, 81, 84, 134, 385/139
See application file for complete search history.

(56) References Cited

U.S. PATENT DOCUMENTS

| | | |
|---|---|---|
| 4,711,518 A | 12/1987 | Shank et al. |
| 4,838,641 A | 6/1989 | Morimoto et al. |
| 5,028,114 A | 7/1991 | Krausse et al. |
| 5,042,891 A | 8/1991 | Mulholland et al. |
| 5,129,023 A | 7/1992 | Anderson et al. |
| 5,337,633 A | 8/1994 | Carpenter et al. |
| 5,367,594 A | 11/1994 | Essert et al. |
| 5,436,994 A | 7/1995 | Ott et al. |
| 5,461,690 A | 10/1995 | Lampert |
| 5,465,313 A | 11/1995 | Belenkly et al. |
| 5,481,634 A | 1/1996 | Anderson et al. |
| 5,548,677 A | 8/1996 | Kakii et al. |
| 5,604,832 A | 2/1997 | Hall et al. |
| 5,606,635 A | 2/1997 | Haake |
| 5,638,474 A | 6/1997 | Lampert et al. |
| 5,719,977 A | 2/1998 | Lampert et al. |
| 5,720,907 A | 2/1998 | Anderson et al. |

(Continued)

FOREIGN PATENT DOCUMENTS

| | | |
|---|---|---|
| EP | 0547778 A1 | 11/1992 |
| EP | 0468671 B1 | 1/1996 |

(Continued)

*Primary Examiner* — Jennifer Doan

(57) ABSTRACT

Dust caps, fiber optic connectors, fiber optic splitter modules and fiber optic connector systems including interlocking aligning features for fiber optic connector parking in fiber distribution hub networks are disclosed. According to one embodiment, a dust cap for mounting upon a ferrule of a fiber optic connector includes a sleeve extending lengthwise between opposed first and second ends. The sleeve defines a lengthwise extending bore that opens through the first end for receiving at least a portion of the ferrule. The dust cap further includes an aligning feature at the second end of the sleeve. The aligning feature includes a neck portion and an interlocking portion such that the interlocking portion has a width that is greater than a width of the neck portion. The aligning feature is configured to slidably engage with a slot of a parking clip.

25 Claims, 12 Drawing Sheets

(56) References Cited

U.S. PATENT DOCUMENTS

| | | | |
|---|---|---|---|
| 5,751,874 A | 5/1998 | Chudoba et al. | |
| 5,764,833 A | 6/1998 | Kakii et al. | |
| 5,943,460 A | 8/1999 | Mead et al. | |
| 6,078,719 A | 6/2000 | Wiegard et al. | |
| 6,079,297 A | 6/2000 | Chandler et al. | |
| 6,585,423 B1 | 7/2003 | Vergeest | |
| 6,754,960 B1 | 6/2004 | Shiraishi et al. | |
| 6,863,444 B2 | 3/2005 | Anderson et al. | |
| 7,011,454 B2 | 3/2006 | Caveney et al. | |
| 7,104,702 B2 | 9/2006 | Barnes et al. | |
| 7,178,990 B2 | 2/2007 | Caveney et al. | |
| 7,241,056 B1 | 7/2007 | Kuffel et al. | |
| 7,264,410 B1 | 9/2007 | Doss et al. | |
| 7,280,733 B2 | 10/2007 | Larson et al. | |
| 7,347,627 B2 | 3/2008 | Saito et al. | |
| 7,369,738 B2 | 5/2008 | Larson et al. | |
| 7,398,599 B2 | 7/2008 | Shiraishi et al. | |
| 7,452,138 B2 | 11/2008 | Saito et al. | |
| 7,556,438 B2 | 7/2009 | Oike et al. | |
| 7,568,845 B2 | 8/2009 | Caveney et al. | |
| 7,628,549 B2 | 12/2009 | Takahashi et al. | |
| 7,637,673 B2 | 12/2009 | Oike et al. | |
| 7,654,748 B2 | 2/2010 | Kuffel et al. | |
| 7,722,262 B2 | 5/2010 | Caveney | |
| 8,041,177 B2 * | 10/2011 | Zimmel et al. | 385/139 |
| 8,224,144 B2 * | 7/2012 | Allen | 385/135 |
| 8,369,677 B2 * | 2/2013 | Allen | 385/135 |
| 8,408,813 B2 | 4/2013 | Barnes et al. | |
| 8,459,880 B2 | 6/2013 | Castonguay et al. | |
| 8,523,455 B2 | 9/2013 | Luther et al. | |
| 8,702,318 B2 | 4/2014 | Isenhour et al. | |

FOREIGN PATENT DOCUMENTS

| | | |
|---|---|---|
| EP | 2081064 A1 | 7/2009 |
| JP | 2005265973 A | 9/2005 |
| JP | 2005265974 A | 9/2005 |
| JP | 2009229506 A | 10/2009 |

* cited by examiner

US 8,939,655 B2

DUST CAPS, FIBER OPTIC CONNECTORS, AND FIBER OPTIC SPLITTER MODULES INCORPORATING INTERLOCKING KEY FEATURES

BACKGROUND

1. Field

The present disclosure generally relates to optical fiber splitter modules and, more particularly, to dust caps, fiber optic connectors, fiber optic splitter module assemblies, and fiber optic connector systems for use in fiber hub distribution cabinets of a fiber optic communications network.

2. Technical Background

Fiber optic communications networks often use fiber distribution hubs containing optical splitter modules to connect entities to the network. Typically, splitter modules are maintained in a fiber distribution hub cabinet that may be accessed by field personnel to make connections to the network. Splitter modules may be configured with loose, connectorized pigtails that are individually connected and removed to and from the fiber optic communications network within the fiber distribution hub cabinet. Many loose, individual connectorized pigtails may become unmanageable within the fiber distribution hub cabinet, particularly when first installing an optical splitter module. The loose connectorized pigtails may become tangled, misplaced, and/or damaged.

Optical splitter modules may be parked at a location within the fiber distribution hub via a holder for later removal and connection of the individual fiber optic connectors of the splitter module. The individual fiber optic connectors on the end of the pigtails include dust caps to protect an internal ferrule within a body of the fiber optic connector from dust and other debris. When fiber optic connectors are removed from the holder by field personnel, the dust caps remain attached to the fiber optic connectors. For field personnel to test the splitter module, the dust caps must be removed from the fiber optic connector. After testing is complete, the dust caps are sometimes lost or fall on the ground and become contaminated. The lack of a clean dust cap may cause damage to the fiber optic connectors of the optical splitter module.

SUMMARY

Embodiments of the present disclosure are directed to dust caps, fiber optic connectors, and fiber optic splitter modules that enable an array of fiber optic connectors to be parked within a fiber distribution hub cabinet by aligning features located on the dust cap. More specifically, the aligning features of the dust cap allow the fiber optic connectors to be connected to a parking clip by an interlocking relationship with corresponding clip aligning features of the parking clip. A connector organizer component is also used to organize and maintain loose fiber optic connectors in an array. In this regard, according to one embodiment, a dust cap for mounting upon a ferrule of a fiber optic connector includes a sleeve extending lengthwise between opposed first and second ends. The sleeve defines a lengthwise extending bore that opens through the first end for receiving at least a portion of the ferrule. The dust cap further includes an aligning feature at the second end of the sleeve. The aligning feature includes a neck portion and an interlocking portion such that the interlocking portion has a width that is greater than a width of the neck portion. The aligning feature is configured to slidably engage with a slot of a parking clip.

According to another embodiment, a fiber optic connector includes a connector body including an optical coupling surface, a ferrule disposed within the connector body and at least partially accessible at the optical coupling surface, an optical fiber at least partially disposed within the ferrule, and a dust cap removably coupled to the ferrule. The dust cap includes a sleeve extending lengthwise between opposed first and second ends, wherein the sleeve defines a lengthwise extending bore that opens through the first end for receiving at least a portion of the ferrule. The dust cap further includes an aligning feature at the second end of the sleeve, the aligning feature including a neck portion and an interlocking portion, such that the interlocking portion has a width that is greater than a width of the neck portion. The aligning feature is configured to slidably engage with a slot of a parking clip.

According to yet another embodiment, a fiber optic splitter module includes a connector organizer component and an array of fiber optic connectors. The connector organizer component includes a connector support member, a plurality of connector retention members extending from the connector support member that are orthogonal with respect to the connector support member, a first sidewall and a second sidewall extending from a first surface of the connector support member and the second surface of the connector support member, and an ejector plate. The plurality of connector retention members defines a plurality of gaps. The first sidewall and the second sidewall are orthogonal with respect to the connector support member. A slot extends through at least a portion of a length of each of the first sidewall and the second sidewall. The ejector plate has a length, a first end, and a second end, and is positioned on the connector support member such that the first end is positioned through the slot of the first sidewall and the second end is positioned through the slot of the second sidewall.

Each fiber optic connector includes a connector body having an optical coupling surface, a ferrule disposed within the connector body and at least partially accessible at the optical coupling surface, an optical fiber at least partially disposed within the ferrule, and a dust cap removably coupled to the ferrule. The dust cap includes an aligning feature having a neck portion and an interlocking portion, wherein the interlocking portion has a width that is greater than a width of the neck portion. At least a portion of the array of fiber optic connectors is supported by the connector support member, and the neck portion of each fiber optic connector is positioned within a respective gap of the plurality of gaps defined by the plurality of connector retention members.

According to yet another embodiment, a fiber optic connector system includes a connector organizer component, an array of fiber optic connectors, and a parking clip. The connector organizer includes a connector support member, a connecting face orthogonal with respect to the connector support member, and an ejector plate having a length, a first end, and a second end. The ejector plate is positioned on the connector support member such that the first end extends beyond a first edge of the connector support member and the second end extends beyond a second edge of the connector support member. Each fiber optic connector includes a connector body including an optical coupling surface, a ferrule disposed within the connector body and at least partially accessible at the optical coupling surface, an optical fiber at least partially disposed within the ferrule, and a dust cap removably coupled to the ferrule. The dust cap includes an aligning feature having a neck portion and an interlocking portion. The interlocking portion has a width that is greater than a width of the neck portion, and the dust cap of each fiber optic connector is slidably coupled to the connecting face of the connector organizer component.

The parking clip includes a coupling face including an array of slots. Each slot includes a throat portion and a retention portion. The neck portion of the aligning feature of the dust cap for each fiber optic connector is slidably positioned in the throat portion of the slot, and the interlocking portion of the aligning feature is slidably positioned in the retention portion of the slot.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments are directed to dust caps, fiber optic connectors, fiber optic splitter modules, and fiber optic connector systems for use in fiber distribution hub cabinets of a fiber optic communications network. Generally, embodiments of the present disclosure include a dust cap with a built-in aligning feature that allows the dust cap and its associated fiber optic connector to be parked or otherwise secured in a fiber distribution hub cabinet. The fiber distribution hub cabinet may include a parking clip or other structure that is configured to accept the aligning feature of the dust caps associated with the fiber optic connectors.

More specifically, the embodiments described herein may facilitate easy parking of fiber optic connectors in a fiber distribution hub cabinet, while also simplifying the management of dust caps associated with the fiber optic connectors. In some embodiments, an array of fiber optic connectors are arranged and maintained in a connector organizer. Each fiber optic connector includes a dust cap having an aligning feature that is configured to engage with a corresponding slot of a parking clip within the fiber distribution hub cabinet. The connector organizer is configured to maintain the array of fiber optic connectors via the aligning feature of each dust cap until the array of fiber optic connector are later parked in the fiber distribution hub cabinet via the dust caps of the array of fiber optic connectors. A parking clip may include a coupling face that has an array of slots that are configured to slidably accept the aligning feature of the dust caps associated with the array of fiber optic connectors.

To park the array of fiber optic connectors of the fiber optic splitter module assembly, the user may align the aligning features of the dust caps with the array of slots of the parking clip and apply a force to an ejector plate of the connector organizer to eject the array of fiber optic connectors from the connector organizer. The array of fiber optic connectors remains coupled to the parking clip via the engagement of the aligning feature of the dust caps within the array of slots of the parking clip. The connector organizer may then be discarded. The connector organizer is not connected to the parking clip at any time. The user may then pull on an individual fiber optic connector to remove it from the dust cap and the parking clip to then connect the individual fiber optic connector to the fiber optic communications network. The dust cap, because of the engagement of the aligning feature with the slot, remains in the parking clip and therefore does not get easily lost or damaged.

Various dust caps, fiber optic connectors, fiber optic splitter modules, and fiber optic connector systems are described in detail herein with specific reference to the appended figures.

Figure 1:
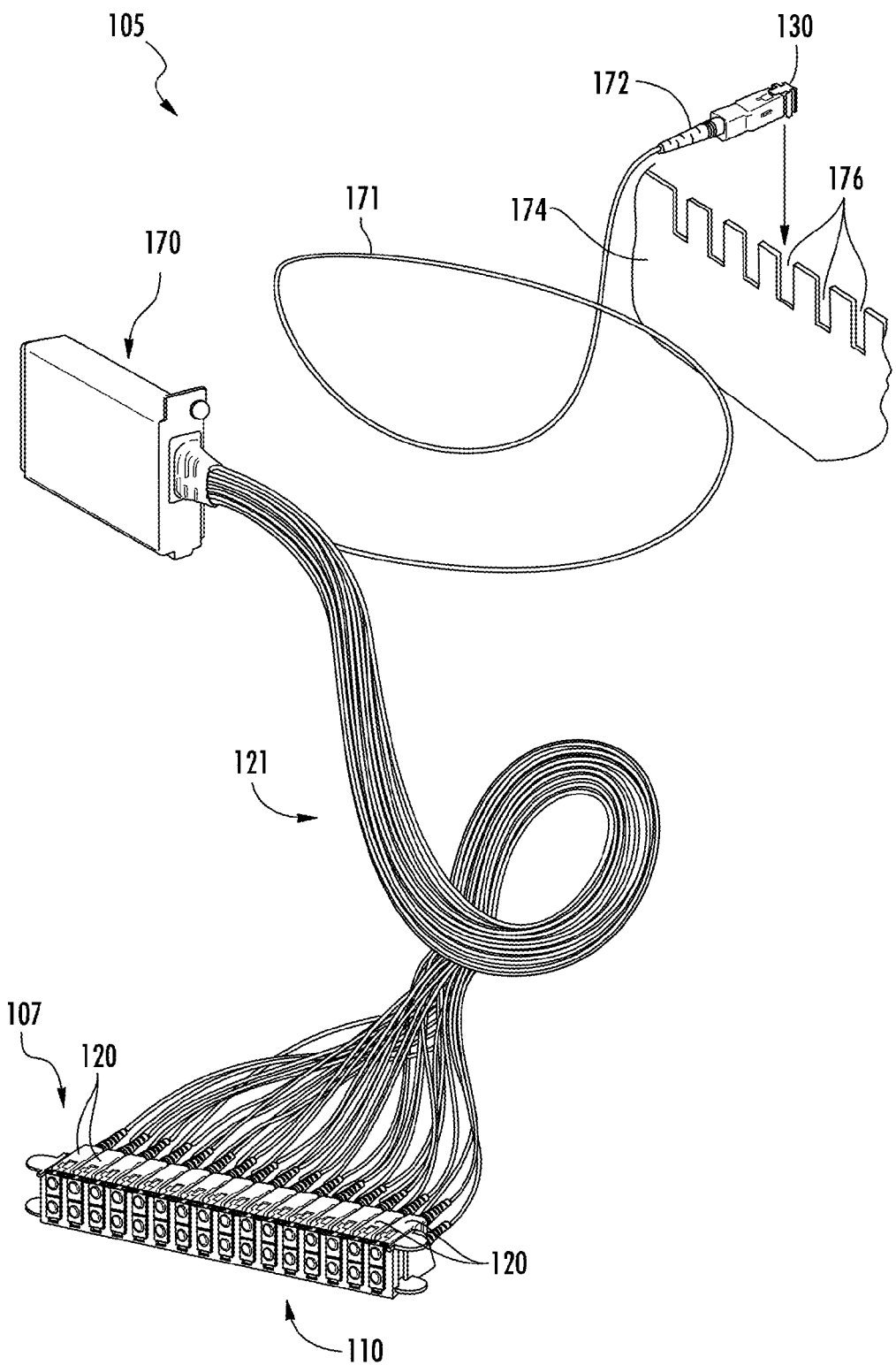
FIG. 1 depicts a perspective view of a portion of an exemplary fiber optic splitter module assembly.

Referring initially to FIG. 1, a fiber optic splitter module assembly 105 comprising a splitter output end 107 having an array of fiber optic connectors 120 connected to a splitter module 170 by a plurality of splitter legs 121 is illustrated. The plurality of splitter legs 121 extend from of the splitter module 170. An input optical fiber 171 extends from the splitter module 170 and terminates at an input fiber optic connector 172. The splitter module 170 may comprise optical components to split optical signals passing therethrough. Optical signals propagating through the input optical fiber 171 toward the splitter module 170 are split amongst the array of fiber optic connectors 120. Optical signals propagating from the individual fiber optic connectors 120 pass through the splitter module 170 and the input fiber optic connector 172. As described in detail below, the array of fiber optic connectors 120 are mounted on a parking clip (not shown in FIG. 1) via aligning features present on a dust cap of each fiber optic connector. The input fiber optic connector 172 may be similarly mounted at an input retention component 174 using the same (or similar) dust cap as the dust cap of the fiber optic connectors 120. For example, the input retention component 174 may include slots 176 configured to receive the aligning feature of the dust cap 130 as described above with respect to the connector organizer component 150. In another embodiment, the input retention component 174 may include aligning features similar to the clip aligning features 115 described above with respect to the parking clip 110 such that the input fiber optic connector 172 mates with the input retention component 174 by a dovetail connection. The fiber optic spiller module assembly 105 may be utilized in a fiber optic connector system within a fiber distribution hub cabinet, as described below.

Figure 2:
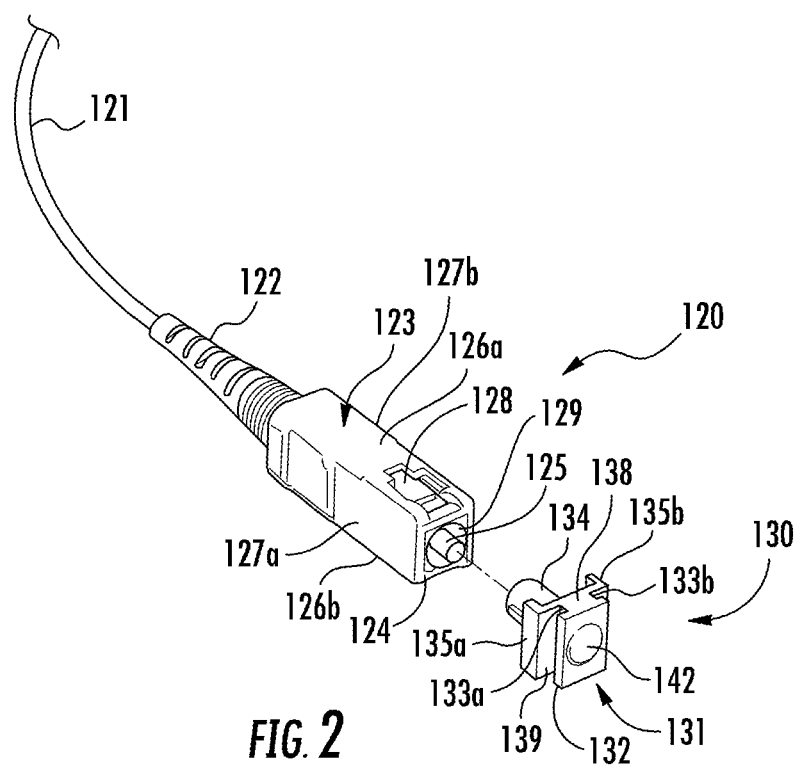
FIG. 2 depicts a perspective, partially exploded view of an exemplary fiber optic connector and an exemplary dust cap.
Figure 3A:
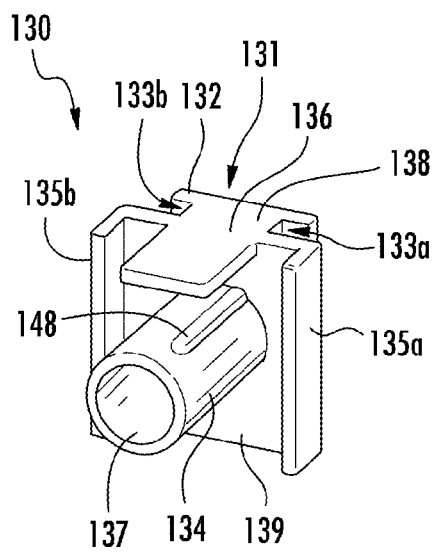
FIG. 3A depicts a rear perspective view of the exemplary dust cap depicted in FIG. 2.
Figure 3B:
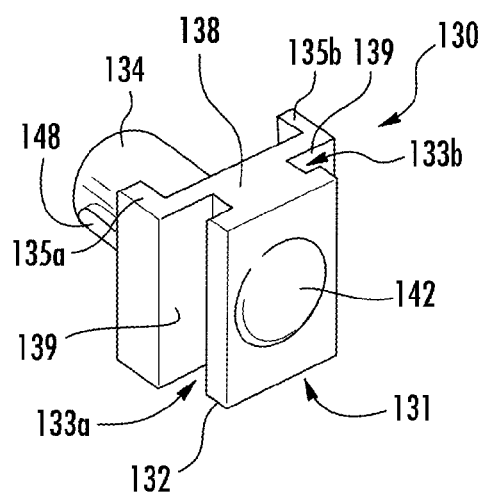
FIG. 3B depicts a front perspective view of the exemplary dust cap depicted in FIG. 2.
Figure 4A:
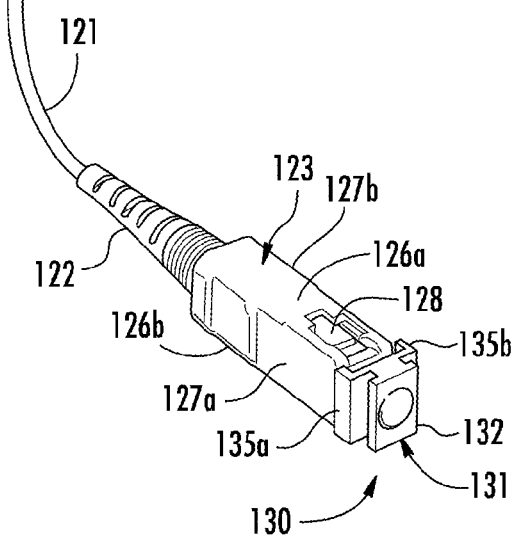
FIG. 4A is a bottom perspective view of the exemplary fiber optic connector and the exemplary dust cap depicted in FIG. 2.
Figure 4B:
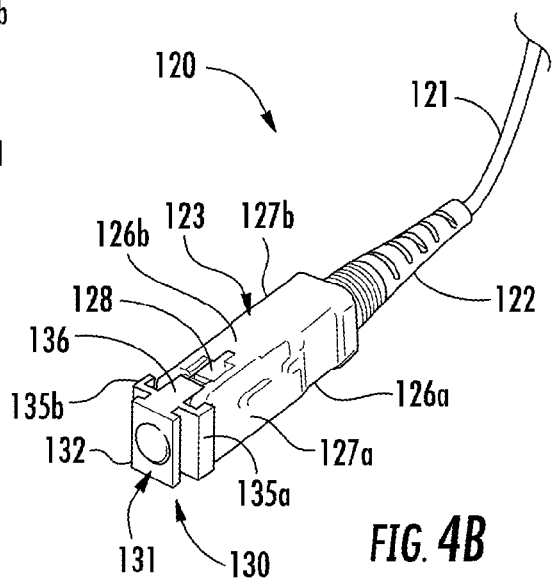
FIG. 4B is a top perspective view of the exemplary fiber optic connector and the exemplary dust cap depicted in FIG. 2.

Referring now to FIGS. 2, 3A, 3B, 4A, and 4B, an exemplary fiber optic connector 120 and associated dust cap 130 according to one embodiment are illustrated. FIG. 2 is a perspective view of a fiber optic connector 120 with the dust cap 130 removed. FIGS. 3A and 3B are rear and front perspective views of the dust cap 130, respectively; while FIGS. 4A and 4B are top and bottom perspective view of the fiber optic connector 120 with the dust cap 130 positioned thereon, respectively.

The fiber optic connector 120 illustrated in FIGS. 2, 3A, 3B, 4A, and 4B is configured as an SC connector commonly used in fiber distribution hub cabinets. It should be understood that the embodiments may be utilized in fiber optic connectors other than SC connectors. The illustrated fiber optic connector 120 generally comprises a connector body 123 having a top surface 126a, a bottom surface 126b, a first surface 127a, a second surface 127b, and an optical coupling surface 124. It is noted that terms such as "top" and "bottom" are used only for convenience, and are not intended to limit the embodiments described herein. For example, a top surface may become a bottom surface when the particular component is rotated one hundred and eighty degrees. A splitter leg 121 configured as an optical fiber comprising a fiber optic core (not shown) is disposed within the connector body 123. The connector body 123 surrounds a ferrule 125 that is exposed in the optical coupling surface 124 by an opening 129. The fiber optic core is positioned within the ferrule to pass optical signals to and from the splitter leg 121. A strain relief feature 122 may also be provided at a rear surface of the connector body 123 to prevent external forces from damaging the splitter leg 121 and/or the connector body 123.

The exemplary dust cap 130 is designed to be mounted about the ferrule 125 to protect the front face of the ferrule 125 from contaminates. The dust cap 130 generally comprises a sleeve 134. While the sleeve 134 is depicted to have a generally cylindrical outer surface, the sleeve 134 may be shaped differently so long as the sleeve 134 does not interfere with the mounting of the dust cap 130 on the ferrule 125. The sleeve 134 defines a lengthwise extending bore 137 that opens for receiving at least a portion of the ferrule 125. In some embodiments, the sleeve 134 may include a key feature 148 to allow the dust cap 130 to only be coupled to the fiber optic connector 120 and/or ferrule 125 in one proper orientation.

The dust cap 130 further includes an end member 139 that closes one end of the lengthwise extending bore 137. While the end member 139 and the sleeve 134 can be discrete components, the end member 139 and the sleeve 134 are typically integrally formed, such as by molding. The exemplary end member 139 is configured to substantially cover the optical coupling surface 124 of the connector body 123. Although the end member 139 is illustrated as generally rectangular, embodiments are not limited thereto. For example, the end member 139 may have an oval or circular shape. In the illustrated embodiment, the end member 139 further includes first and second collar members 135a, 135b that orthogonally extend from the side surfaces of the end member 139. The first and second collar members 135a, 135b are configured to be in contact with, or be minimally spaced from, the first and second surfaces 127a, 127b of the connector body 123 to prevent rotation of the dust cap 130 with respect to the fiber optic connector 120. In embodiments wherein the connector body does not have parallel sides, the first and second collars members 135a, 135b may be non-orthogonal with respect to the end member 139. Additionally, in other embodiments, the dust cap 130 may not include the first and second collars 135a, 135b.

Referring specifically to FIGS. 4A and 4B, one or more of the top and bottom surfaces 126a, 126b of the connector body 123 may include a recess 128 for receiving a flange portion 136 that extends from the end member 139 of the dust cap 130. Mating of the flange portion 136 and the recess 128 may also prevent rotational movement of the dust cap 130 with respect to the connector body 123. In other embodiments, the dust cap 130 does not include such a flange portion.

Referring once again to FIGS. 2, 3A, 3B, 4A, and 4B, the exemplary dust cap 130 further includes a arraying feature 131 that extends lengthwise from the end member 139. The aligning feature 131, as described in detail below, is configured to mate with corresponding gaps 156 of the connector organizer component 150 and slots 116 of the parking clip 110. The aligning feature 131 includes a neck portion 138 that extends from the end member 139, and an interlocking portion 132 that extends laterally from the neck portion 138. The interlocking portion 132 has a width that is greater than the width of the neck portion 138. In this manner, the interlocking portion 132 defines shoulders that extend beyond the neck portion, thereby creating first and second interstices 133a, 133b between the interlocking portion 132 and the end member 139. The aligning feature 131 is configured to mate with the slots 116 of the parking clip 110 in a dovetail joint-type of mating arrangement.

The dust cap 130 may be molded of a polymer material. In one embodiment, the dust cap 130 is made of molded Nylon 12. Other suitable materials may also be used. In the illustrated embodiment, the dust cap 130 is made of an optically transmissive material that allows optical signals to pass therethrough. The dust cap includes an integrated planoconvex lens 142 for expanding or focusing an optical signal that is passing out of or into the splitter leg 121. The lens 142 is aligned with the ferrule 125 along the length of the dust cap 130 to pass optical signals to and from the splitter leg 121. The optically transmissive dust cap 130 may enable field personnel to test the splitter leg 121 and fiber optic connector 120 without removing the dust cap 130 from the ferrule 125. The planoconvex lens 142 may be configured as the planoconvex lenses of the dust caps described in U.S. Pat. No. 6,712,524. In other embodiments, the dust cap 130 may be made of a material that is opaque to the optical signals passing through the splitter leg 121, and may not include an integrated lens.

Figure 5A:
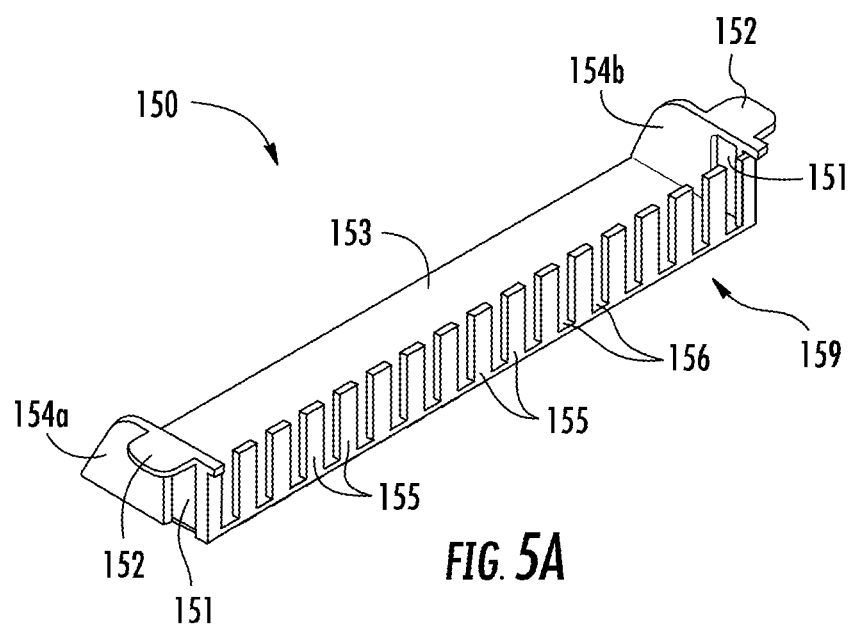
FIG. 5A is a front perspective view of an exemplary connector organizer component.
Figure 5B:
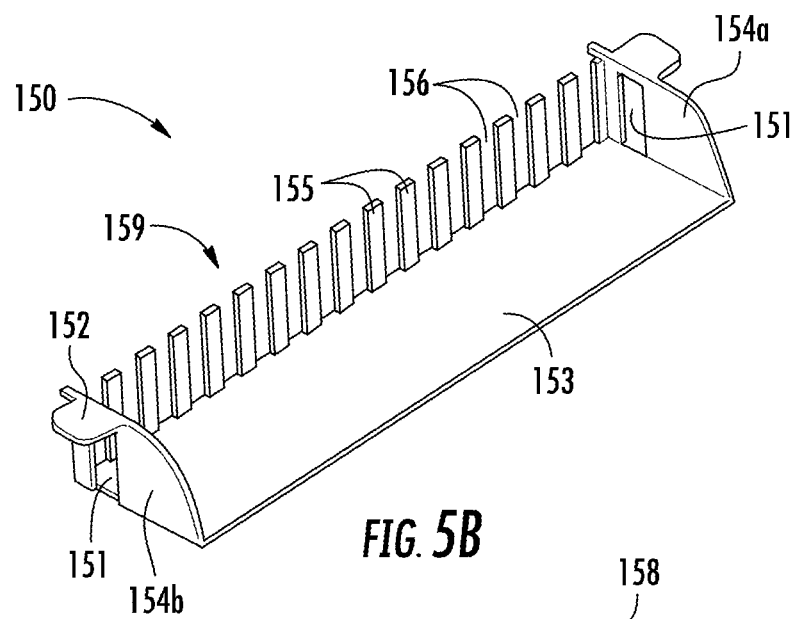
FIG. 5B is a rear perspective view of the exemplary connector organizer component depicted in FIG. 5A.

Referring now to FIGS. 5A and 5B, a connector organizer component 150 is illustrated according to one embodiment. As described above, the connector organizer component 150 is configured to maintain the individual fiber optic connectors 120 in an organized array. The exemplary connector organizer component 150 generally comprises a connector support member 153, a connecting face 159, a first sidewall 154a, and a second sidewall 154b. The connector support member 153 provides a planar surface on which at least a portion of the individual fiber optic connectors 120 may be supported. The connecting face 159 is configured to accept the aligning feature 131 of the dust caps 130, and is orthogonal with respect to the connector support member 153. In the illustrated embodiment, the connecting face 159 comprises a plurality of connector retention members 155 that extend from an edge of the connector support member 153. The connector retention members 155, which may extend orthogonally from the connector support member, may define a plurality of gaps 156 for receiving the aligning feature 131 of the dust caps 130 associated with the array of fiber optic connectors 120.

Figure 6:
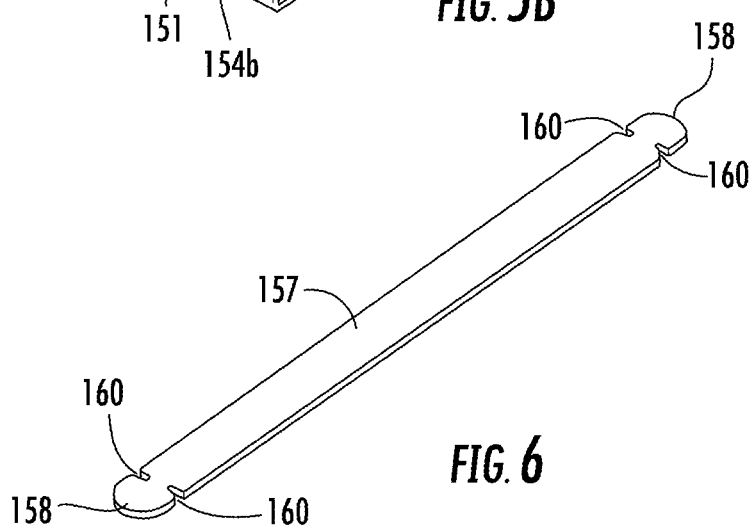
FIG. 6 is a perspective view of an exemplary ejector plate for use with the exemplary connector organizer component depicted in FIGS. 5A and 5B.
Figure 7A:
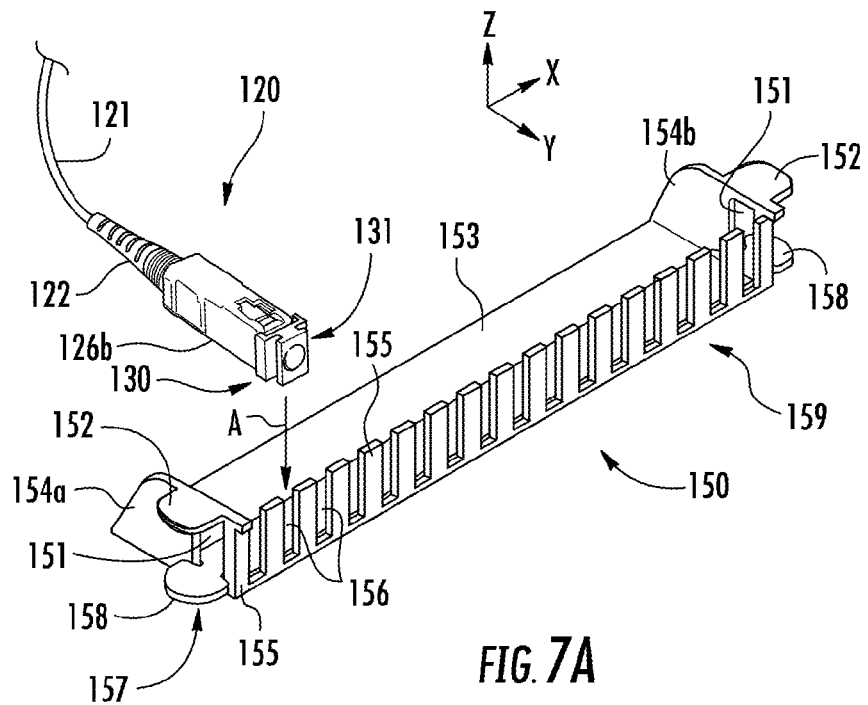
FIG. 7A is a front perspective view of an exemplary fiber optic connector being inserted into the exemplary connector organizer component depicted in FIGS. 5A and 5B.

The first and second sidewalls 154a, 154b may be included to provide additional support to the array of fiber optic connectors 120. The connector organizer component 150 of the illustrated embodiment further includes an ejector plate 157 that is positioned on the connector support member 153. FIG. 6 depicts a perspective view of an exemplary ejector plate 157, while FIG. 7A depicts a perspective view of the exemplary ejector plate 157 positioned on the connector support member 153 of the connector organizer component 150 depicted in FIGS. 5A and 5B. The ejector plate 157 is a flat, slender plate having a first and second ends 158. The first and second ends 158 each have a curved, tab portion; however, embodiments are not limited to such tab portions. The first and second sidewalls 154a, 154b of the illustrated connector organizer component 150 each have an ejector slot 151 through which the ejector plate 157 is positioned so that the first and second ends 158 extend beyond the first and second sidewalls 154a, 154b. The first and second ends 158 of the ejector plate 157 may also include notches 160 that slidably engage portions of the first and second sidewalls 154a, 154b. The notches 160 may aid in preventing the ejector plate 157 from sliding out through the ejector slots 151 of the first and second sidewalls 154a, 154b.

The first and second sidewalls 154a, 154b may also include laterally extending tabs 152. As described in detail below, the laterally extending tabs 152 may provide a convenient surface onto which a user may grip when sliding the ejector plate 157 to eject the array of fiber optic connectors 120 from the connector organizer component 150.

The connector organizer component 150 and ejector plate 157 may be made of any suitable material, such as molded polymers. Because the connector organizer component 150 and ejector plate 157 are intended to be discarded after the array of fiber optic connectors 120 is parked in the fiber distribution hub cabinet, they may be made of an inexpensive material to reduce the cost of the fiber optic splitter module assembly 105.

Referring specifically now to FIG. 7A, the connector organizer component 150 may be populated with fiber optic connectors 120 by aligning the neck portion 138 of the dust cap 130 with a gap 156 between two adjacent connector retention members 155, and sliding the fiber optic connector 120 downwardly toward the connector support member 153, as indicated by arrow A. At least a portion of the two adjacent connector retention members 155 are positioned within the first and second interstices 133a, 133b of the dust cap 130 (see FIG. 3B) such that the dust cap 130 and fiber optic connector 120 are retained by the connector organizer component 150. Additional fiber optic connectors 120 are similarly positioned within the free gaps 156 of the connector organizer component 150.

Figure 7B:
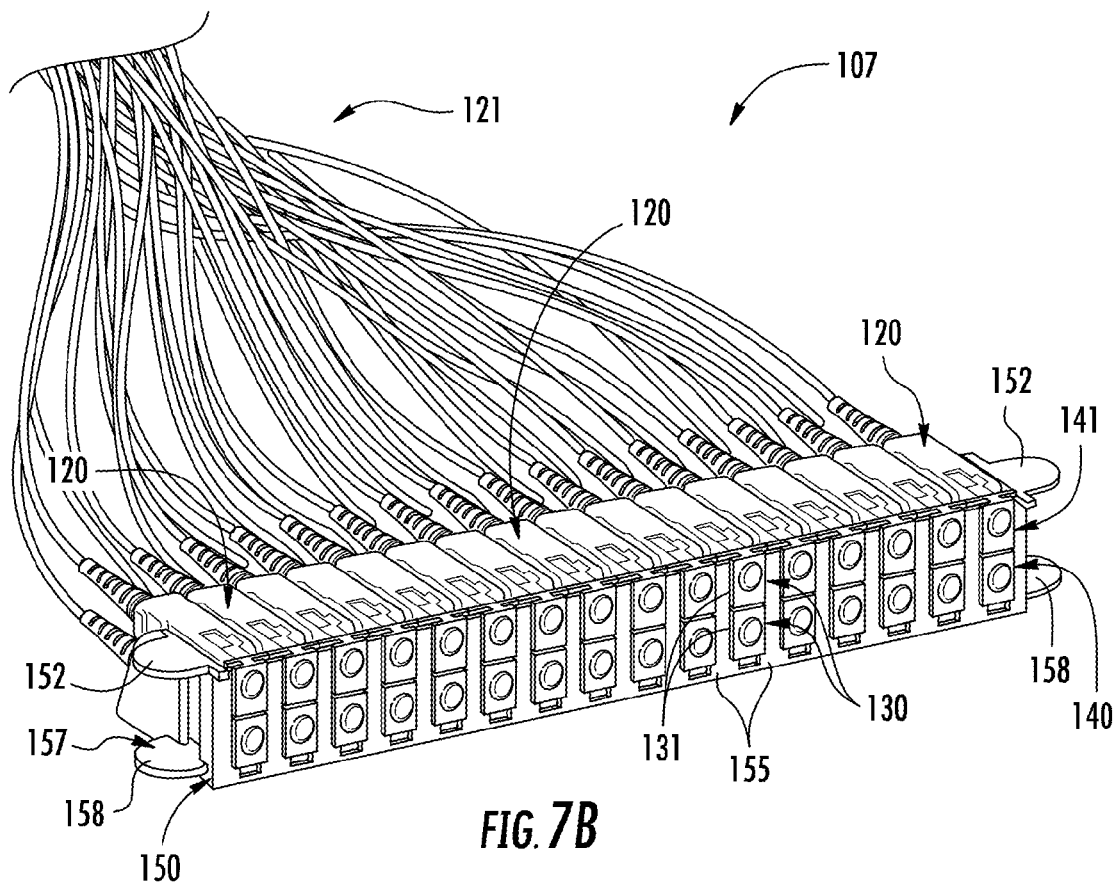
FIG. 7B is a front perspective view of the exemplary connector organizer component depicted in FIGS. 5A and 5B populated with an array of fiber optic connectors.

FIG. 7B depicts a fiber optic splitter module assembly 105 comprising a splitter output end 107 having a connector organizer component 150 that is fully populated with fiber optic connectors 120. In the illustrated embodiment, the fiber optic splitter module assembly 105 comprises two rows (first row 140 and second row 141) and sixteen columns of fiber optic connectors 120. In other embodiments, the connector organizer component 150 may be configured to retain more or fewer rows and columns of fiber optic connectors 120 than the embodiment depicted in FIG. 7B. The bottom surface 126b of the fiber optic connectors 120 in the first row 140 contact the ejector plate 157, while the bottom surface 126b of the fiber optic connectors 120 in the second row 141 contact the top surface 126a of the fiber optic connectors 120 in the first row 140. In some cases, the fiber optic splitter module assembly 105 may be packaged as depicted in FIG. 7B such that it is ready to be parked in a fiber distribution hub cabinet.

Figure 7C:
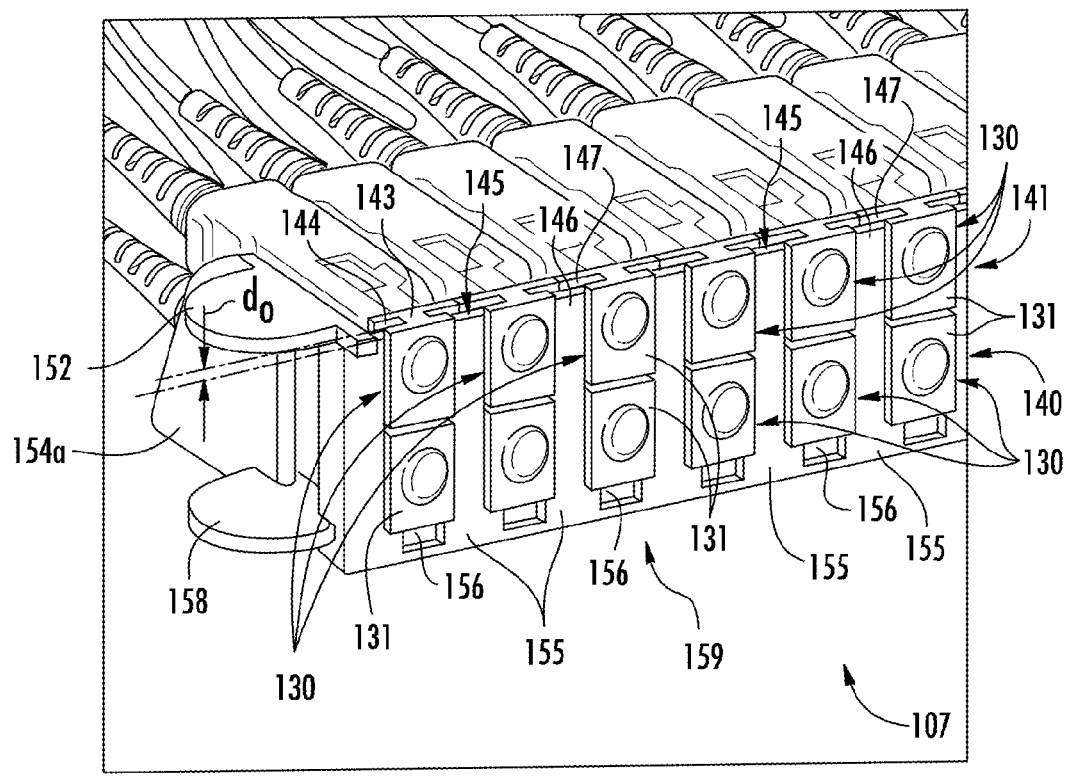
FIG. 7C is a close-up perspective view of the populated exemplary connector organizer component depicted in FIG. 7B.

FIG. 7C is a close-up, perspective view of the connecting face 159 of the connector organizer component 150 populated with fiber optic connectors 120. A top surface 143 of the dust caps 130 associated with the fiber optic connectors 120 in the second row 141 extend beyond a top surface 144 of the connector retention members 155 by an offset distance $d_o$, which may assist the user in inserting the aligning feature 131 of the dust caps into the slots 116 of the parking clip 110, as described below. However, in other embodiments the top surface 143 of the dust caps 130 associated with the fiber optic connectors 120 in the second row 141 may not extend beyond the top surface 144 of the connector retention members 155.

Adjacent aligning features 131 extending from the connector face 159 of the connector organizer component 150 define dust cap slots 145 comprising a narrow throat portion 146 and a wide retention portion 147. The dust cap slots 145 are configured to mate with the clip aligning features 115 of the parking clip 110, as described below with reference to FIGS. 8A-8D and 9A-9E. Accordingly, the dust caps 130 of the array of fiber optic connectors 120 provide an array of alternating aligning features 131 (male interlocking component) and dust cap slots 145 (female interlocking component) for mating with symmetric interlocking features of the parking clip 110.

Figure 8A:
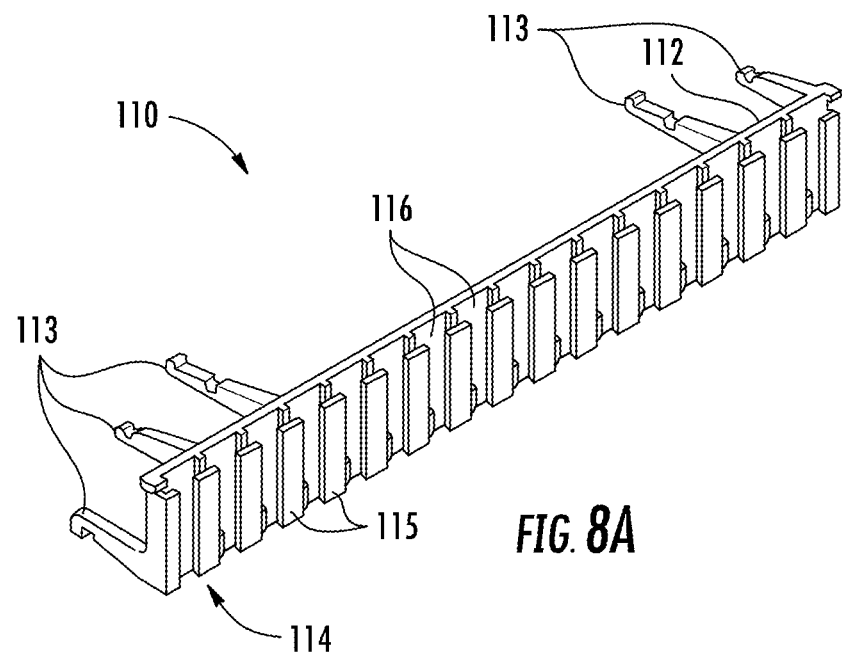
FIG. 8A is a front perspective view of an exemplary parking clip.
Figure 8B:
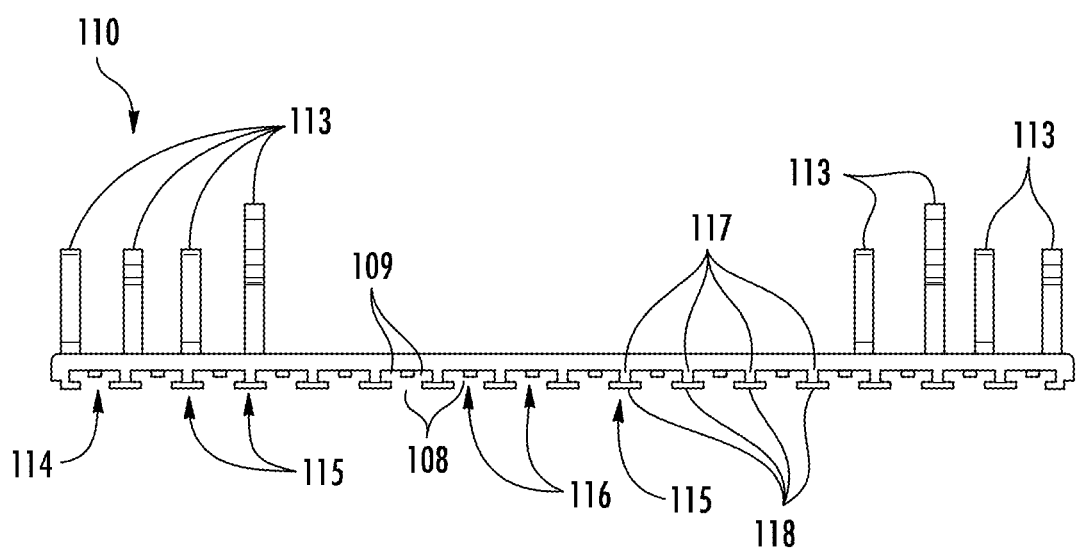
FIG. 8B is a top view of the exemplary parking clip depicted in FIG. 8A.
Figure 8C:
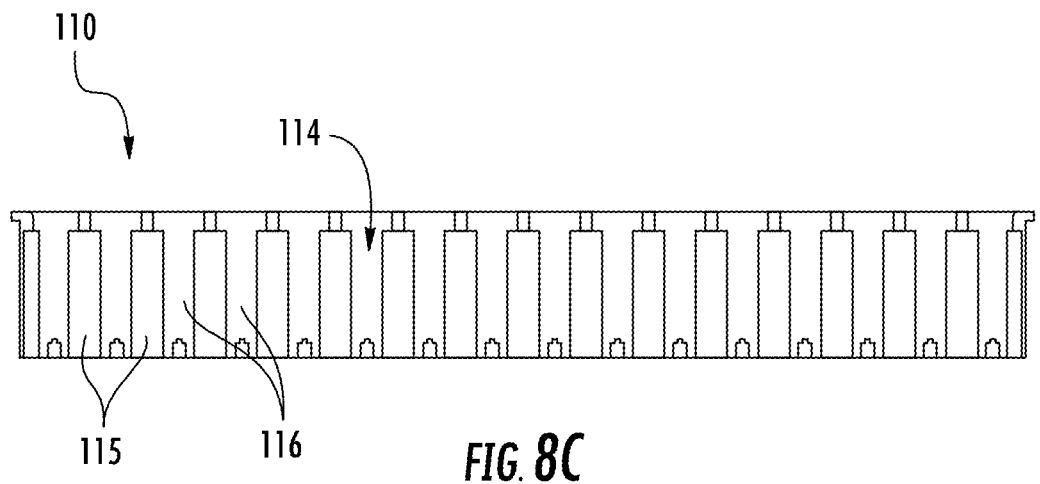
FIG. 8C is a front elevation view of the exemplary parking clip depicted in FIG. 8A.
Figure 8D:
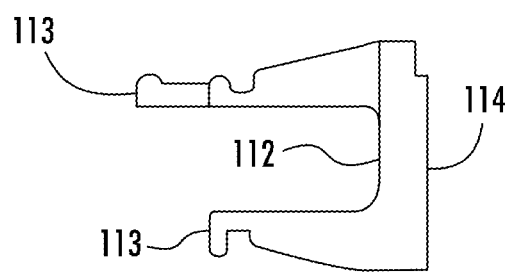
FIG. 8D is a side elevation view of the exemplary parking clip depicted in FIG. 8A.

Referring now to FIGS. 8A-8D, an exemplary parking clip 110 configured to receive the fiber optic the fiber optic connectors 120 is illustrated. FIG. 8A is a perspective view, FIG. 8B is a top view, FIG. 8C is a front view, and FIG. 8D is a side view of the parking clip 110. The parking clip 110 generally comprises a coupling face 114, a rear surface 112, and engagement features 113 extending from the rear surface 112. The parking clip 110 is configured to be attached to a panel within a fiber distribution hub cabinet via the engagement features 113. It should be understood that embodiments are not limited to the number or configuration of the engagement features 113, as the number and configuration of the engagement features 113 may be dictated by the type of panel to which the parking clip 110 is to be attached.

The coupling face 114 of the illustrated parking clip 110 comprises an array of clip aligning features 115 that comprise a neck portion 117 and an interlocking portion 118 that are dimensionally similar to the aligning feature 131 of the dust caps 130, as described above. Adjacent clip aligning features 115 form an array of slots 116 having a narrow throat portion 108 and a wide retention portion 109. The aligning features 131 of the dust caps 130 extending from the connector organizer component 150 are sized and configured to be slidably positioned in the array of slots 116 of the parking clip 110 to couple the fiber optic connectors 120 to the parking clip 110 by a dovetail, interlocking relationship. The parking clip 110 may be fabricated of a durable material that is capable of maintaining a parked array of fiber optic connectors 120.

Figure 9A:
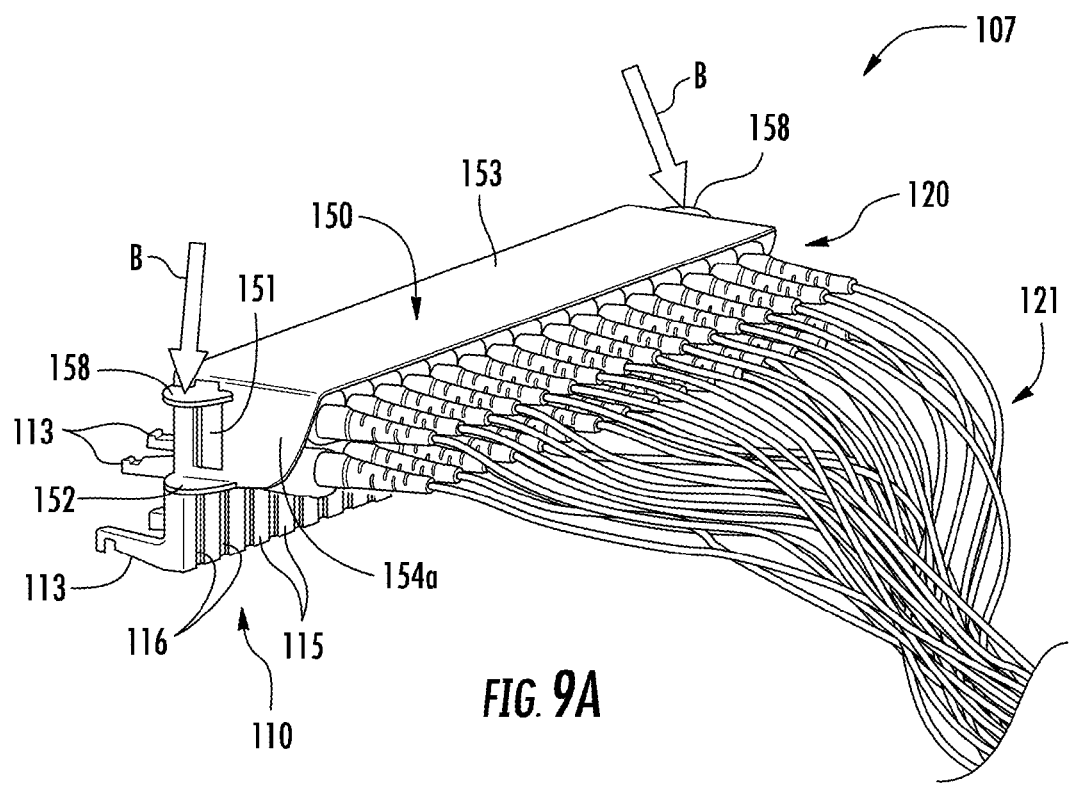
FIG. 9A is a front perspective view of a portion of an exemplary fiber optic splitter module partially coupled to an exemplary parking clip.
Figure 9B:
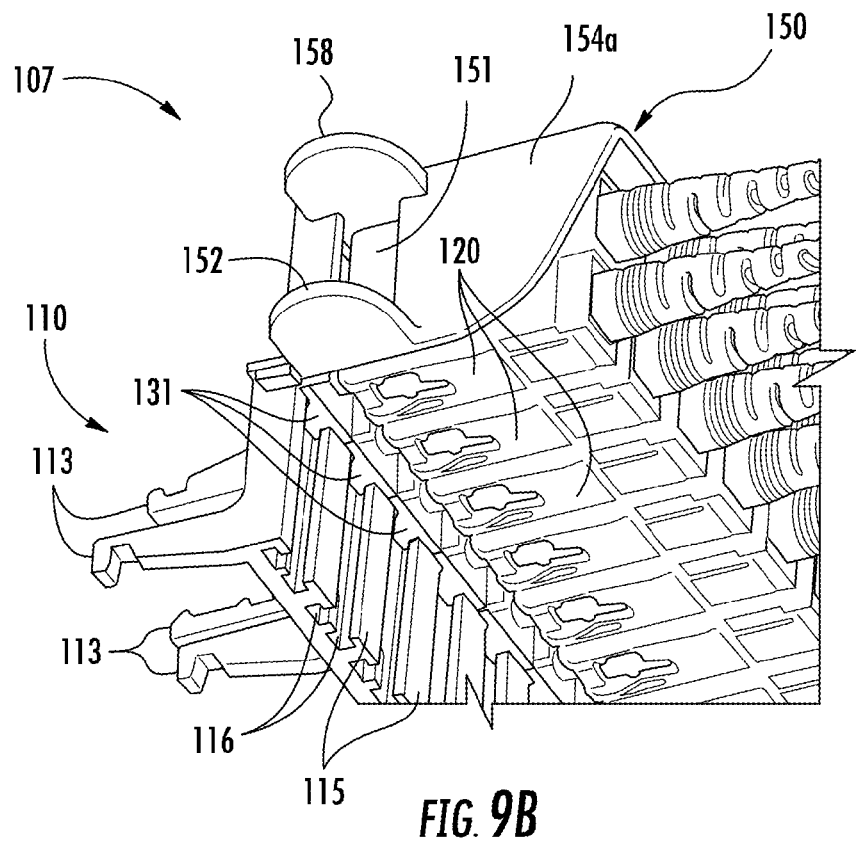
FIG. 9B is a bottom, close-up perspective view of the exemplary fiber optic splitter module partially coupled to the exemplary parking clip depicted in FIG. 9A.
Figure 9C:
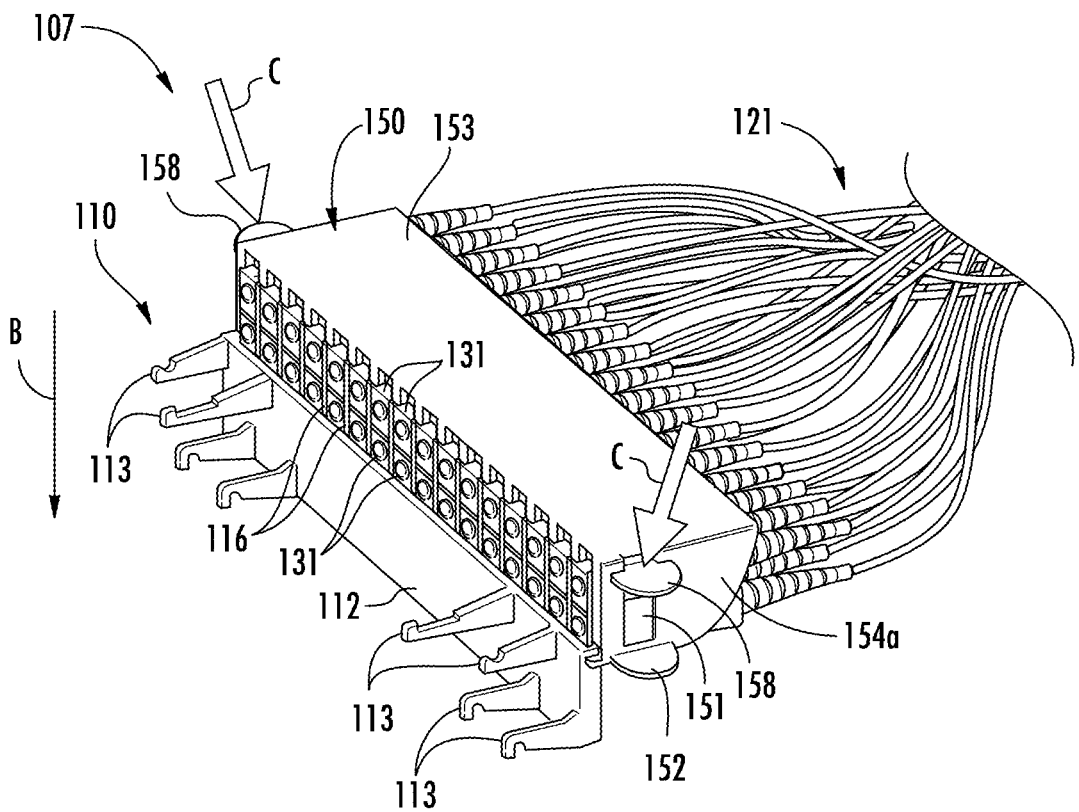
FIG. 9C is a rear perspective view of the exemplary fiber optic splitter module partially coupled to the exemplary parking clip depicted in FIG. 9A.
Figure 9D:
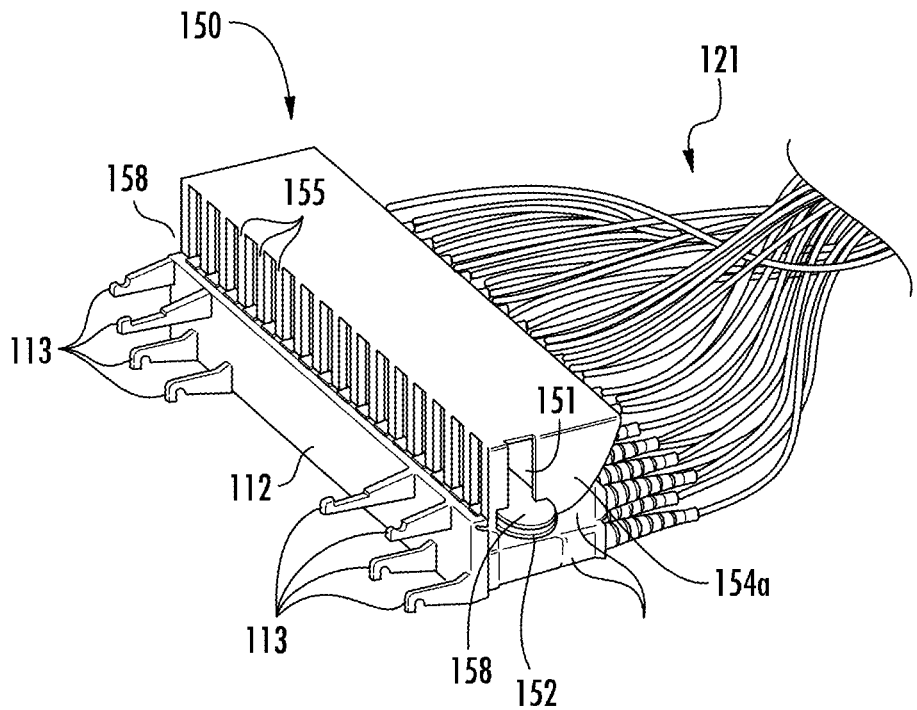
FIG. 9D a rear perspective view of the exemplary fiber optic splitter module partially coupled to the exemplary parking clip depicted in FIG. 9A wherein the ejector plate is slid in a downward direction to eject the array of fiber optic connectors from the connector organizer component.
Figure 9E:
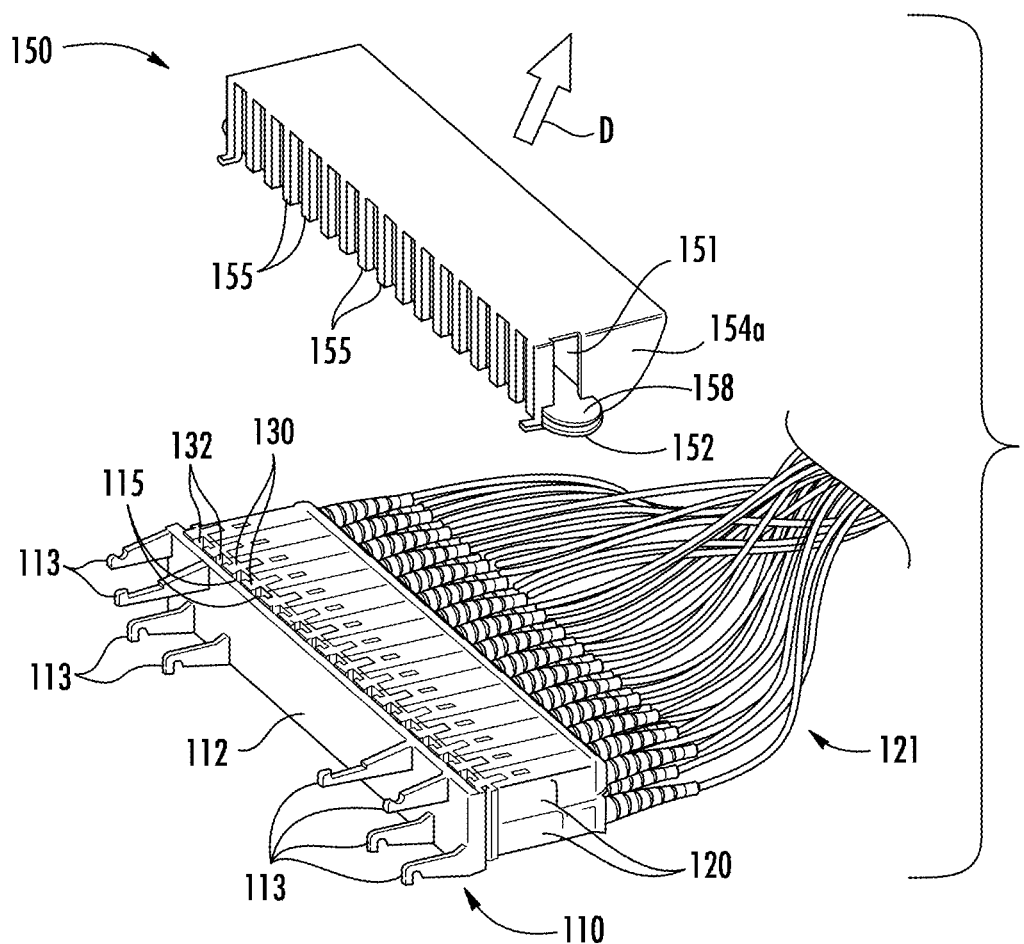
FIG. 9E is a rear perspective view of the exemplary fiber optic splitter module partially coupled to the exemplary parking clip depicted in FIG. 9A, wherein the exemplary connector organizer is removed from the array of fiber optic connectors.
Figure 9F:
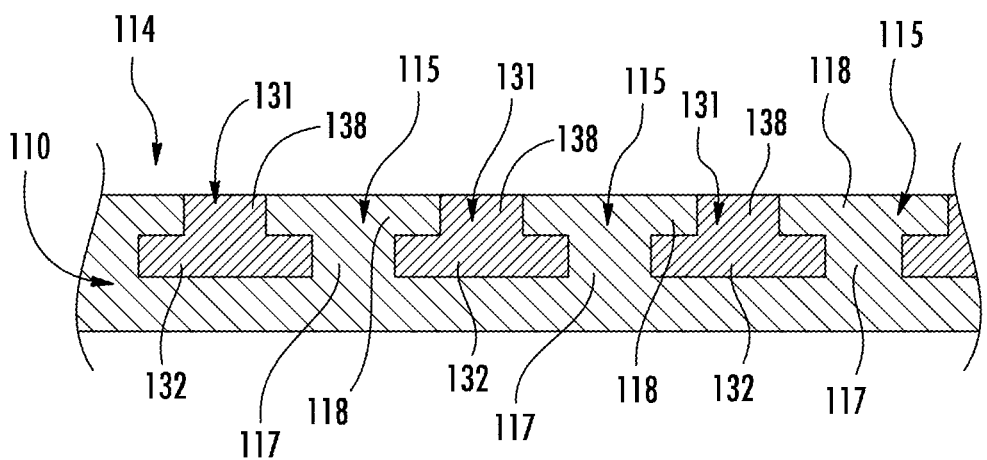
FIG. 9F is a cross-sectional top view of interlocking aligning features of the dust caps and the parking clip.

FIGS. 9A-9E depict how a user may park fiber optic connectors 120 onto a parking clip 110 according to one embodiment. FIG. 9A is a front perspective view of a parking clip 110 with a splitter output end 107 of a fiber optic splitter module assembly 105 located in a position prior to sliding the aligning features 131 of the dust caps 130 into the slots 116 of the parking clip 110. FIG. 9B depicts a bottom view of the aligning features 131 of the dust caps 130 partially inserted into the slots 116 of the parking clip 110. FIG. 9C depicts the aligning features 131 of the dust caps 130 partially inserted into the slots 116 of the parking clip 110. FIG. 9D depicts the fiber optic connectors 120 partially ejected from the connector organizer component 150, and FIG. 9E depicts a fiber optic fiber optic connectors 120 of the splitter legs 121 are fully inserted on a parking clip 110 by the dust caps 130 of the fiber optic connectors 120. FIG. 9F is a schematic illustration of the interlocking connection between the aligning features 131 of the dust caps 130 and the clip aligning features 115 of the parking clip 110.

To park the fiber optic connectors 120 onto the parking clip 110, the user may orient the fiber optic splitter module assembly 105 such that the connector support member 153 is the top surface, and the first and second ends 158 of the ejector plate 157 are located above the laterally extending tabs 152 of the connector organizer component 150. As best shown in FIG. 9B, the aligning features 131 of the dust caps 130 associated with the fiber optic connectors 120 are aligned with the corresponding slots 116 of the parking clip. More specifically, the interlocking portion 132 of the dust caps 130 are aligned and inserted into the wide retention portion 109 of the slots 116 of the parking clip 110. Similarly, the interlocking portion 118 of the clip aligning features 115 are aligned and inserted into the wide retention portion 147 of the dust cap slots 145 defined by the adjacent dust caps 130 (see FIG. 9F).

Once the aligning features 131 of the dust caps 130 and the slots 116 of the parking clip 110 are aligned, the user may move the fiber optic splitter module assembly 105 in downward direction as indicated by arrow B to slide the interlocking portion 132 of the dust caps 130 into the wide retention portion 109 of the slots of the parking clip 110. The user may also apply a downward force on the first and second ends 158 of the ejector plate 157, as indicated by arrow C to eject the fiber optic connectors 120 from the connector organizer component 150. For example, the user may grab the laterally extending tabs 152 of the connector organizer component 150 with his or her index fingers, and apply the downward force on the first and second ends 158 of the ejector plate 157 with his or her thumbs. The downward force on the ejector plate 157 causes the first and second ends 158 to slide downwardly within the ejector slots 151 of the first and second sidewalls 154a, 154b, which thereby pushes the array of fiber optic connectors 120 out of the connector organizer component 150. As indicated by arrow D in FIG. 9E, the user may discard the corrector organizer component 150 after the fiber optic connectors 120 are parked 120. It is noted that at no time is the connector organizer component 150 coupled to or otherwise attached to the parking clip 110 during and after the parking of the fiber optic connectors 120.

The array of fiber optic connectors 120 are now coupled to the parking clip 110 via the interlocking relationship between the dust caps 130 and the coupling face of the parking clip 110. FIG. 9F schematically depicts the interlocking relationship between the aligning feature 131 of the dust caps 130 and the coupling face 114 of the parking clip 110. The neck 138 and interlocking portion 132 of the aligning feature 131 of the dust caps 130 are positioned within the slots 116 (the slots are not numbered in FIG. 9F for clarity) defined by the neck portion 117 and interlocking portion 118 of adjacent clip aligning features 115 of the parking clip 110. Accordingly, the fiber optic connectors 120 are connected to the parking clip 110 by a dovetail-type connecting arrangement between the dust caps 130 and the coupling face 114.

It should be understood that the aligning feature 131 of the dust caps 130 and the clip aligning feature 115 of the parking clip 110 may be of configurations other than the "T" shape configuration depicted in the figures. For example, the interlocking portion 132/118 and the neck portion 138/117 of the aligning features 131 and the clip aligning features 115 may be a single mechanical feature having a trapezoidal shape common in traditional dovetail joints (i.e., trapezoidal pins and tails of traditional dovetail joints). Other configurations may also be possible.

Figure 10:
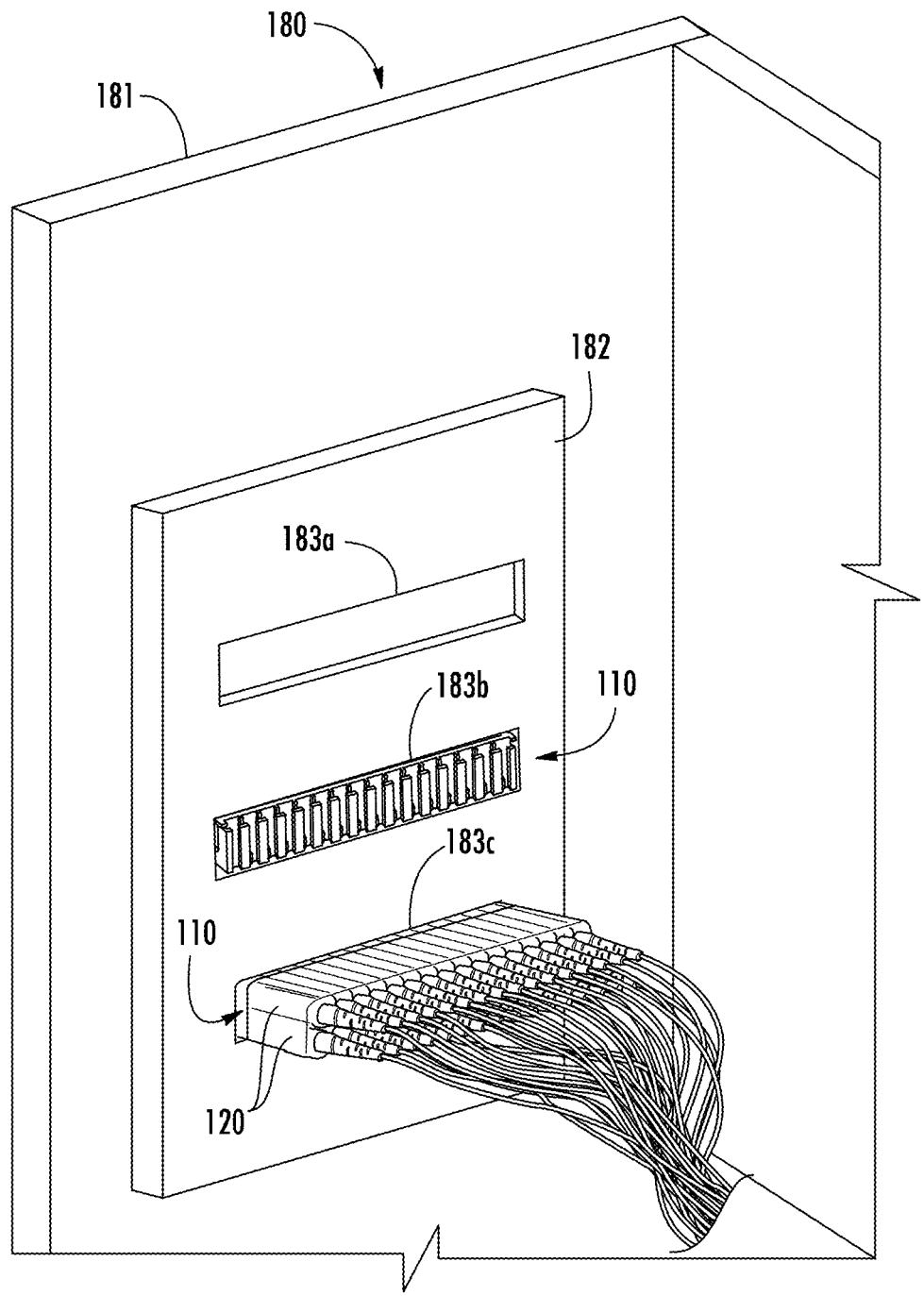
FIG. 10 is a partial perspective view of an exemplary fiber distribution hub cabinet with an exemplary array of a fiber optic connector parked therein.

FIG. 10 schematically depicts an interior of an exemplary fiber distribution hub cabinet 180 having a door 181. A panel 182 is associated with the door 181 to accept pre-installed parking clips 110. FIG. 11 depicts a partially populated panel 182 having first, second and third openings 183a-183c for receiving a parking clip 110. The parking clips 110 may be maintained within the first, second and third openings 183a-183c by the engagement features 113 described above. For example, the engagement features 113 may allow the parking clips 110 to be snapped into the openings 183a-183c. Any number of panel openings may be provided. The illustrated panel 182 has an empty first opening 183a, a second opening 183b with only a parking clip 110, and a third opening 183c having a parking clip 110 with an array of fiber optic connectors 120 parked thereon. In most cases, the panel 182 will be pre-populated with parking clips 110. Once the array of fiber optic connectors 120 are parked, the input fiber optic connector 172 may be parked as described above with respect to FIG. 10, or optically connected to the fiber optic network. The user may pull on an individual fiber optic connector 120 to remove it from the parking clip 110 and connect it to the fiber optic network. The action of pulling the individual fiber optic connector 120 causes it to be decoupled from the dust cap 130. Because of the interlocking relationship between the dust cap 130 and the parking clip 110, the dust cap 130 remains on the parking clip 110, thereby preventing the dust cap 130 from falling to the ground and becoming contaminated or lost. Accordingly, the parking clip 110 provides a means of organizing and maintaining disconnected dust caps 130 during testing and/or connection of fiber optic connectors 120.

It should now be understood that embodiments disclosed herein are directed to dust caps, fiber optic connectors, fiber optic splitter modules assemblies, and fiber optic connector systems that enable an array of fiber optic connectors to be parked within a fiber distribution hub cabinet by aligning features located on the dust cap. More specifically, the aligning features of the dust cap allow the fiber optic connector to be connected to a parking clip by an interlocking relationship with corresponding clip aligning features of the parking clip. Further, embodiments may include a disposable connector organizer component that organizes and retains loose fiber optic connectors in an array prior to parking the fiber optic connectors in a fiber distribution hub cabinet. The array of fiber optic connectors may be ejected from the connector organizer component by an ejector plate as the array of fiber optic connectors is parked on the parking clip. Removal of individual fiber optic connectors from the parking clip leaves the associated dust caps still attached to the parking clip to prevent contamination or loss of the dust caps.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A dust cap for mounting upon a ferrule of a fiber optic connector, the dust cap comprising:
   a sleeve extending lengthwise between opposed first and second ends, the sleeve defining a lengthwise extending bore that opens through the first end for receiving at least a portion of the ferrule; and
   an aligning feature at the second end of the sleeve, the aligning feature comprising a neck portion and an interlocking portion, wherein the interlocking portion has a width that is greater than a width of the neck portion such that the aligning feature is configured to slidably engage with a slot of a parking clip in a direction orthogonal to a lengthwise direction of the bore.

2. The dust cap of claim 1, wherein:
   the aligning feature further comprises an end member shaped to cover an optical coupling surface of a connector body of the fiber optic connector when the dust cap is coupled to the ferrule;
   the neck portion extends from the end member; and
   the interlocking portion and the end member define first and second interstices.

3. The dust cap of claim 2, wherein the end member comprises a first collar member extending from a first surface of the end member and a second collar member extending from a second surface of the end member; and
   the first collar member is configured to partially cover a first surface of the connector body and the second collar member is configured to at least partially cover a second surface of the connector body.

4. The dust cap of claim 2, wherein the aligning feature further comprises a flange orthogonally extending from the end member to cover at least a portion of the connector body.

5. The dust cap of claim 1, wherein:
   the aligning feature further comprises an end member shaped to cover an optical coupling surface of a connector body of the fiber optic connector when the dust cap is coupled to the ferrule;
   the end member comprises a first collar member extending from a first surface of the end member and a second collar member extending from a second surface of the end member;
   the first collar member is configured to partially cover a first surface of the connector body and the second collar member is configured to at least partially cover a second surface of the connector body;
   the neck portion extends from the end member;
   the interlocking portion and the end member define first and second interstices; and
   the aligning feature further comprises a flange orthogonally extending from the end member to cover at least a portion of the connector body.

6. A fiber optic connector comprising:
   a connector body comprising an optical coupling surface;
   a ferrule disposed within the connector body and at least partially accessible at the optical coupling surface;
   an optical fiber at least partially disposed within the ferrule; and
   a dust cap removably coupled to the ferrule, the dust cap comprising:
      a sleeve extending lengthwise between opposed first and second ends, the sleeve defining a lengthwise extending bore that opens through the first end for receiving at least a portion of the ferrule; and
      an aligning feature at the second end of the sleeve, the aligning feature comprising a neck portion and an interlocking portion, wherein the interlocking portion has a width that is greater than a width of the neck portion such that the aligning feature is configured to slidably engage with a slot of a parking clip in a direction orthogonal to a lengthwise direction of the bore.

7. The fiber optic connector of claim 6, wherein:
   the aligning feature further comprises an end member shaped to cover the optical coupling surface of the connector body when the dust cap is coupled to the ferrule;
   the neck portion extends from the end member; and
   the interlocking portion and the end member define first and second interstices.

8. The fiber optic connector of claim 7, wherein the end member comprises a first collar member extending from a first surface of the end member and a second collar member extending from a second surface of the end member; and
   the first collar member is configured to partially cover a first surface of the connector body and the second collar member is configured to at least partially cover a second surface of the connector body.

9. The fiber optic connector of claim 7, wherein:
   the connector body comprises a recess;
   the aligning feature further comprises a flange orthogonally extending from the end member; and
   the flange is disposed within the recess when the dust cap is coupled to the fiber optic connector.

10. The fiber optic connector of claim 6, wherein:
the connector body comprises a recess;
the aligning feature further comprises an end member shaped to cover a front face of the connector body of the fiber optic connector when the dust cap is coupled to the ferrule;
the end member comprises a first collar member extending from a first surface of the end member and a second collar member extending from a second surface of the end member;
the first collar member is configured to partially cover a first surface of the connector body and the second collar member is configured to at least partially cover a second surface of the connector body;
the neck portion extends from the end member;
the interlocking portion and the end member define first and second interstices;
the aligning feature further comprises a flange orthogonally extending from the end member; and
the flange is disposed within the recess when the dust cap is coupled to the fiber optic connector.

11. A fiber optic splitter module assembly comprising:
a connector organizer component comprising:
connector support member;
plurality of connector retention members extending from the connector support member that are orthogonal with respect to the connector support member, wherein the plurality of connector retention members define a plurality of gaps;
a first sidewall and a second sidewall extending from a first surface of the connector support member and the second surface of the connector support member, respectively, wherein the first sidewall and the second sidewall are orthogonal with respect to the connector support member, and a slot extends through at least a portion of a length of each of the first sidewall and the second sidewall; and
an ejector plate having a length, a first end, and a second end, wherein the ejector plate is positioned on the connector support member such that the first end is positioned through the slot of the first sidewall and the second end is positioned through the slot of the second sidewall; and
an array of fiber optic connectors, each fiber optic connector comprising:
a connector body comprising an optical coupling surface;
a ferrule disposed within the connector body and at least partially accessible at the optical coupling surface;
an optical fiber at least partially disposed within the ferrule; and
a dust cap removably coupled to the ferrule, the dust cap comprising an aligning feature, the aligning feature comprising a neck portion and an interlocking portion, wherein the interlocking portion has a width that is greater than a width of the neck portion;
wherein at least a portion of the array of fiber optic connectors is supported by the connector support member, and the neck portion of each fiber optic connector is positioned within a respective gap of the plurality of gaps defined by the plurality of connector retention members.

12. The fiber optic splitter module assembly of claim 11, wherein the array of fiber optic connectors comprises at least two stacked rows of fiber optic connectors.

13. The fiber optic splitter module assembly of claim 11, wherein:
the aligning feature further of each dust cap comprises an end member shaped to cover the optical coupling surface of the connector body of the fiber optic connector when the dust cap is coupled to the ferrule;
the neck portion extends from the end member;
the interlocking portion and the end member define first and second interstices; and
for each fiber optic connector of the array of fiber optic connectors, at least a portion of connector retention members adjacent to the fiber optic connector are located within the first and second interstices of the dust cap associated with the fiber optic connector.

14. The fiber optic splitter module assembly of claim 13, wherein the at least a portion of connector retention members adjacent to the fiber optic connector are located within the first and second interstices by an interference fit.

15. The fiber optic splitter module assembly of claim 13, wherein the end member of each dust cap comprises a first collar member extending from a first surface of the end member and a second collar member extending from a second surface of the end member; and
the first collar member is configured to partially cover a first surface of the connector body and the second collar member is configured to at least partially cover a second surface of the connector body.

16. The fiber optic splitter module assembly of claim 13, wherein:
the connector body of each fiber optic connector comprises a recess;
the aligning feature of each dust cap further comprises a flange orthogonally extending from the end member; and
the flange is disposed within the recess when the dust cap is coupled to the fiber optic connector.

17. The fiber optic splitter module assembly of claim 11, wherein the ejector plate is configured to slide within the ejector of the first sidewall and the second sidewall to remove the array of fiber optic connectors from the connector organizer component by an application of force on the first end and the second end of the ejector plate.

18. The fiber optic splitter module assembly of claim 11, wherein the first sidewall and the second sidewall each comprise a flange portion.

19. A fiber optic connector system comprising:
a connector organizer component comprising:
connector support member;
a connecting face orthogonal with respect to the connector support member; and
an ejector plate having a length, a first end, and a second end, wherein the ejector plate is positioned on the connector support member such that the first end extends beyond a first edge of the connector support member and the second end extends beyond a second edge of the connector support member;
an array of fiber optic connectors, each fiber optic connector comprising:
a connector body comprising an optical coupling surface;
a ferrule disposed within the connector body and at least partially accessible at the optical coupling surface;
an optical fiber at least partially disposed within the ferrule; and
a dust cap removably coupled to the ferrule, the dust cap comprising an aligning feature, the aligning feature comprising a neck portion and an interlocking portion, wherein the interlocking portion has a width that is greater than a width of the neck portion, and the dust cap of each fiber optic connector is slidably coupled to the connecting face of the connector organizer component; and a parking clip comprising a coupling face including an array of slots, each slot comprising a throat portion and a retention portion, wherein for the dust cap of each fiber optic connector:

the neck portion of the aligning feature is slidably positioned in the throat portion of the slot; and the interlocking portion of the aligning feature is slidably positioned in the retention portion of the slot.

20. The fiber optic connector system of claim 19, wherein the parking clip further comprises one or more engagement features configured to be coupled to a fiber distribution hub panel.

21. The fiber optic connector system of claim 19, wherein the dust cap of each fiber optic connector is slidably coupled to a slot of the array of slots by a dovetail relationship.

22. The fiber optic connector system of claim 19, wherein, for at least a portion of the array of fiber optic connectors, an edge of the dust cap extends beyond an edge of the connecting face of the connector organizer component.

23. The fiber optic connector system of claim 19, wherein the array of fiber optic connectors is ejected from the connector organizer component by an application of force on the first and second ends of the ejector plate.

24. The fiber optic connector system of claim 19, wherein:
the connecting face comprises:

a plurality of connector retention members extending from the connector support member that are orthogonal with respect to the connector support member, wherein the plurality of connector retention members define a plurality of gaps; and a first sidewall and a second sidewall extending from a first surface of the connector support member and the second surface of the connector support member, respectively, wherein the first sidewall and the second sidewall are orthogonal with respect to the connector support member, and an ejector slot extends through at least a portion of a length of each of the first sidewall and the second sidewall;

the ejector plate is positioned on the connector support member such that the first end is positioned through the ejector slot of the first sidewall and the second end is positioned through the ejector slot of the second sidewall; and the neck portion of each fiber optic connector is positioned within a respective gap of the plurality of gaps defined by the plurality of connector retention members.

25. The fiber optic connector system of claim 19, wherein the array of fiber optic connectors comprises at least two stacked rows of fiber optic connectors.

* * * * *